US005165965A

United States Patent [19]

Martin

[11] Patent Number: 5,165,965

[45] Date of Patent: Nov. 24, 1992

[54] METHOD FOR PROVIDING PREDISTORED IMAGES ON SHRINKABLE FILM

[75] Inventor: Roy M. Martin, Richmond, Va.

[73] Assignee: Reynolds Metals Company, Richmond, Va.

[21] Appl. No.: 635,075

[22] Filed: Dec. 28, 1990

[51] Int. Cl.[5] .......... B05D 5/00; B29B 17/02

[52] U.S. Cl. .......... 427/256; 427/401; 264/342 R; 355/52; 382/44; 395/102

[58] Field of Search .......... 156/86; 427/256, 401; 355/52; 382/44, 54; 395/102; 264/342 R

[56] References Cited

U.S. PATENT DOCUMENTS

| | | | |
|---|---|---|---|
| 3,022,543 | 2/1962 | Baird et al. | 428/34.9 |
| 3,144,398 | 8/1964 | Rainer et al. | 522/161 |
| 3,144,399 | 8/1964 | Rainer et al. | 426/234 |
| 3,238,909 | 3/1966 | Kendall | 72/379.4 |
| 3,663,662 | 5/1972 | Golike et al. | 525/220 |
| 4,057,667 | 11/1977 | Wiggins et al. | 428/35 |
| 4,101,373 | 7/1978 | Schiffman | 156/659 |
| 4,102,734 | 7/1978 | Schiffman | 156/659 |
| 4,102,764 | 7/1978 | Harvey, II et al. | 204/164 |
| 4,111,738 | 9/1978 | Amberg | 156/458 |
| 4,139,099 | 2/1979 | Daly et al. | 206/575 |
| 4,151,040 | 9/1979 | Schiffman | 156/659 |
| 4,348,438 | 9/1982 | Canterino | 428/36 |
| 4,354,997 | 10/1982 | Mizutani et al. | 264/560 |
| 4,644,630 | 2/1987 | Blum | 156/659 |

FOREIGN PATENT DOCUMENTS 63-151694 6/1988 Japan .

*Primary Examiner*—Evan Lawrence
*Attorney, Agent, or Firm*—Alan T. McDonald

[57] ABSTRACT

An image to be printed on shrink film for packaging an object is predistorted before printing so that the printed image will return to substantially its original form when the part of the film bearing the image is shrunk against a predetermined part of the object. The image is subdivided and the subdivisions are enlarged to provide the desired predistorted image.

6 Claims, 5 Drawing Sheets

METHOD FOR PROVIDING PREDISTORED IMAGES ON SHRINKABLE FILM

FIELD OF THE INVENTION

Printing on shrinkable film for packaging, and overcoming distortion of printed copy during shrinkage of the printing substrate, is the field of the invention.

BACKGROUND OF THE INVENTION

Polymeric films are conventionally made shrinkable by stretching and treating them so that they will not shrink back until subsequently heated or otherwise treated to make them shrink. Such films are conventionally used for packaging various objects. When a sheet of film or other material is shrunk tightly against an object, or part of it, any image preprinted on the sheet will be distorted where the body shape has caused uneven shrinkage.

Distortion of preprinting on shrink film has long presented a problem in the packaging industry. The problem can be minimized by positioning the printed area of the film over a flat or cylindrical surface where the film shrinkage is not distorted by the surface shape, or by avoiding use of images that suffer markedly from distortion. However, that leaves many cases where preprinted image distortion during film shrinkage remains a problem.

SUMMARY OF THE INVENTION

The present invention provides a method for predistorting an image so that when the predistortion is printed on film and shrunk with the film around an object, the shrinkage will substantially offset the predistortion and thereby cause substantially the original image to appear. The method of the invention comprises selecting the desired image in its intended final form; determining what distortion of film will occur when it shrinks against said object; from that determination determining what opposite distortion of the desired image, if preprinted on the unshrunk film, will return to the desired form when shrunk against said object; and preprinting such oppositely distorted image on the film before applying it to and shrinking it against said object. The film used must have its shrink capability transverse to the machine direction of the film positioned circumferentially of the object and be capable of enabling the film to shrink until the printed image is in place against the object.

The method of the invention can be practiced through personal observation, measurement and calculation. However, practicing the invention manually raises problems of time, cost and lack of accuracy of detail. For faster and more accurate response to orders for preprinting of new designs on shrink film wrappings, it is an important advantage of the invention that it is suitable for being implemented with the aid of computerized equipment.

The preprinted shrinkable film of the invention is useful in a conventional high-speed packaging line, where an open strip or preseamed sleeve of film is placed around each of a traveling line of objects, sealed around each object and transversely severed between the objects in the case of the strip, and finally heat shrunk around each object as the objects are passed in succession through a thermal or other shrinkage treatment zone.

The invention is also applicable to sheets of shrinkable materials other than film. Other details, objects and advantages of the invention will become apparent as the following disclosure proceeds.

BRIEF DESCRIPTION OF THE DRAWINGS

Present preferred embodiments of the invention are shown, for purposes of illustration only, in the following drawings.

DESCRIPTION OF PRESENT PREFERRED EMBODIMENTS OF THE INVENTION

Figure 1:
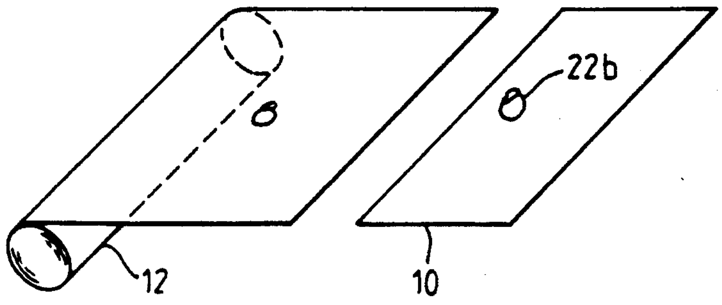
FIG. 1 shows an isometric view of a roll of shrink film with a length of film unwound and severed from the roll.
Figure 2:
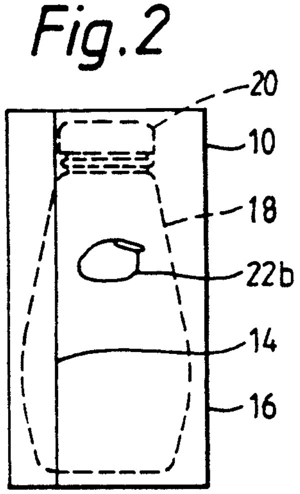
FIG. 2 shows an enlarged side view of a cylindrical sleeve of the severed shrink film of FIG. 1, and a bottle within the sleeve.

Referring now more particularly to the drawings and initially to FIG. 1, a length of heat shrinkable polymeric film 10 is cut from a roll 12 of shrink film which has substantial shrink capability across its width (between the ends of the roll); and minimum or no shrink capability along its length (the machine direction); for example, about 40–60% transverse shrinkage and about 0–20% machine direction shrinkage. The film is stretched more transversely of its machine direction than in its machine direction, at an elevated temperature, and is then chilled to prevent shrinking back until heat is applied.

Figure 3:
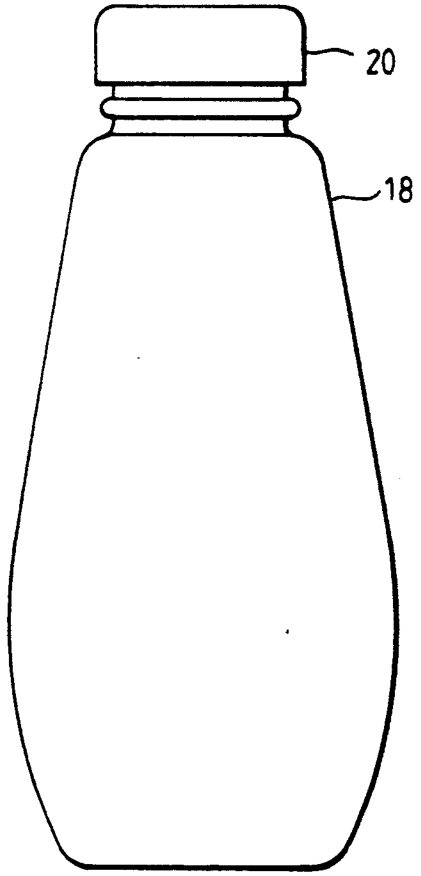
FIG. 3 shows a further enlarged side view of the bottle of FIG. 2 before the film is placed around the bottle.
Figure 6:
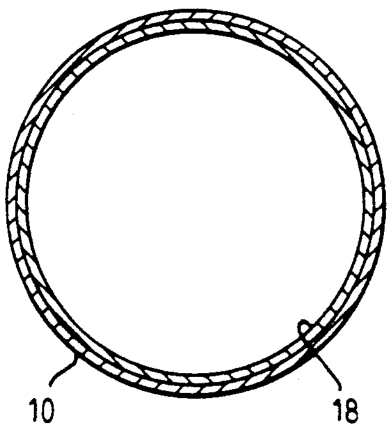
FIG. 6 shows a section on the line VI—VI shown in FIG. 4.

The cut length of film 10 is seamed to itself at 14 along opposite side edges extending in the machine direction to form a sleeve 16. The sleeve 16 is capable of opening into the form of a cylinder whose central axis extends in the machine direction of the film and whose circumference extends in the direction of maximum shrink capability of the film. When so opened, the sleeve 16 is placed around an object, such as a rigid bottle 18 of circular cross-section (FIG. 6), closed by a cap 20 at one end (FIG. 3). A shrinking means (e.g., hot air) is then directed against the sleeve 16 to cause it to shrink tightly against the bottle 18 and cap 20, as shown in FIG. 4.

Figure 4:
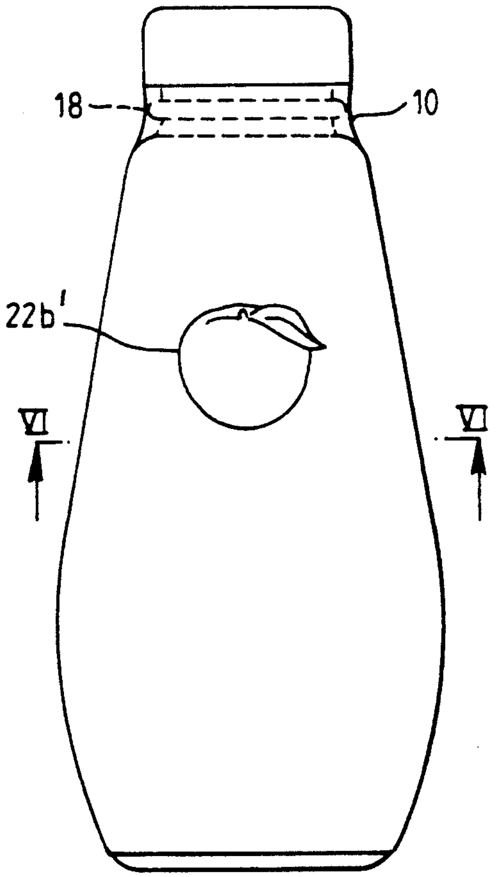
FIG. 4 shows the bottle of FIG. 3 after the film shown in FIG. 2 is shrunk around the bottle.
Figure 7:
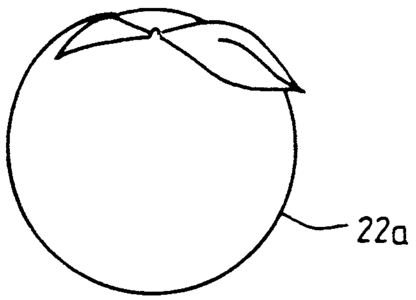
FIG. 7 shows an undistorted image of a peach.
Figure 8:
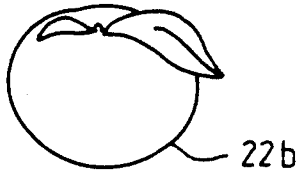
FIG. 8 shows the image of FIG. 7 after predistortion to offset subsequent distortion when film bearing the predistorted image is shrunk onto the bottle, and in reduced scale corresponding to the final scale of the image on a printing roll.
Figure 9:
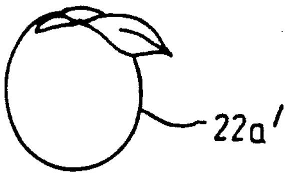
FIG. 9 shows an image originally corresponding in shape to the image shown in FIG. 7, after being printed on film in the reduced scale of FIG. 8 and shrunk onto a bottle such as shown in FIG. 4, without predistortion of the original image.
Figure 10:
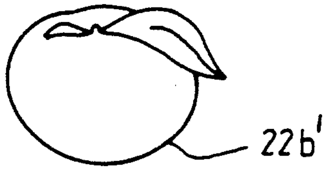
FIG. 10 shows an image which was in the predistorted shape and scale shown in FIG. 8, after being printed on film and shrunk onto the bottle shown in FIG. 4.

An image 22*a* (FIG. 7) is predistorted to a form of image 22*b* (FIG. 8) which is to be printed in a position on film 10 which will cover a predetermined area or level on the neck of bottle 18 (FIG. 4). Images 22*a* and 22*b* may be at a larger scale during predistortion than the scale of the image 22*b* (FIG. 8) when it is put on printing rolls preliminary to being printed. The printed image 22*b* appearing on sleeve 16 shrinks against bottle 18 to its form shown in FIGS. 4 and 10. As can be seen, this closely approximates its original appearance of image 22*a* as shown in FIG. 7, apart from difference in scale. If predistortion is omitted, the resultant image 22*a* on the bottle 18 has a less pleasing narrowed appearance, as shown in FIG. 9.

The required predistorted image 22*b* (FIG. 8) is provided by subdividing image 22*a* at successive horizontal levels from top to bottom of a rectangle enclosing and tangent to image 22*a*. The levels are closely and evenly spaced, except for a small variation for at least one of the subdivisions to make the numbers come out even elsewhere. This variation may be at the top or bottom of the subdivisions, depending on the particular art work; in the present example, the variation is taken at the top of the subdivisions.

Figure 5:
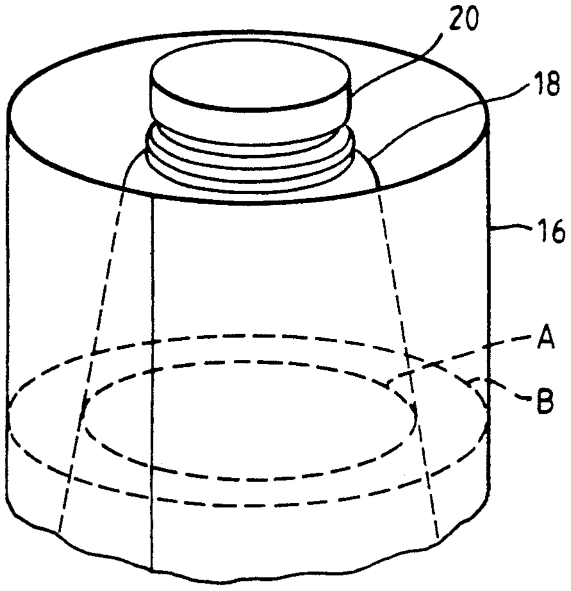
FIG. 5 shows an enlarged isometric view, partially broken away, of the upper ends of the sleeve and bottle shown in FIG. 2.

It would be possible but more trouble to determine the horizontal extent of the image in each subdivision, and elongate that amount to compensate for subsequent shrinkage. Instead, it is preferable to start with the horizontal length of each subdivision between the sides of the above-mentioned rectangle, since that is a constant, and determine how much of each of those lengths should be elongated to compensate for shrinkage of the whole subdivision between the sides of the rectangle. In order to determine the amount of that elongation, attention is drawn to FIG. 5, which shows the circumference A of a bottle 18 at a given level, and at the same level the circumference B of a sleeve of film 10 around the bottle. The ratio of circumference B to circumference A at each successive level indicates how much the circumferential length of an image printed on the film 10 of sleeve 16 must be enlarged at each level in order to return to its original circumferential length when sleeve 16 is shrunk against the bottle.

The determination of the circumference of an object such as a bottle at various levels can be measured independently at each level, or can be calculated when the slope of the object's side is constant, or varies according to a mathematical formula, where the image is to be applied. This is true in the case of the conical neck portion of bottle 18, where the image is positioned in the present example (FIG. 4).

Image 22*a* (FIG. 7) was modified to produce the predistorted image 22*b* (FIG. 8) in the following manner:

(i) The vertical distance between a pair of horizontal lines extending across the top and bottom of image 22*a* was found to measure 24 mm (based on an enlarged scale of image 22*a*);

(ii) The horizontal distance between a pair of vertical lines substantially tangent to the opposite side of image 22*a* was found to measure 40 mm (based on said enlarged scale);

(iii) 18 horizontally divided subdivisions were selected to fit between said horizontal lines, each subdivision extending lengthwise between said vertical lines and being 40 mm wide, and each subdivision being 1 mm high except the top subdivision, which was 7 mm high;

(iv) For each subdivision a percentage increase of the original width of the subdivision was determined (see second step above), one-half of the linear value of the total increased width of each subdivision was determined (equal to 40 mm multiplied by the ratio of the circumference of sleeve 14 to the circumference of bottle 18 at the level of the subdivision), and each subdivision was stretched to the right and left of its center point by said one-half value for that subdivision (the stretching being uniformly distributed within the subdivision, so that the portion of the image in each half of the subdivision was increased in proportion to said ratio of circumferences); and (v) The image 22*b* was recorded (FIG. 8) as it appeared on the assembly of horizontally elongated subdivisions when their centers are in vertical alignment.

The following table shows figures used in carrying out the above procedure for producing image 22*b* from image 22*a* for positioning on bottle 18 substantially where shown in FIG. 4 (the bottle with cap being about 140 mm high, but the following figures being dimensions measured at the larger scale of image 22*a* in FIG. 7):

TABLE 1

| Subdivision | Height | Original Width | % Width Increase | ½ of Increased Width |
|---|---|---|---|---|
| 1 | 7 mm | 40 mm | 121.7% | 24.335 mm |
| 2 | 1 mm | " | 121.2% | 24.25 mm |
| 3 | " | " | 120.7% | 24.125 mm |
| 4 | " | " | 120.2% | 24.04 mm |
| 5 | " | " | 119.7% | 23.96 mm |
| 6 | " | " | 119.2% | 23.835 mm |
| 7 | " | " | 118.7% | 23.75 mm |
| 8 | " | " | 118.2% | 23.625 mm |
| 9 | " | " | 117.7% | 23.54 mm |
| 10 | " | " | 117.2% | 23.46 mm |
| 11 | " | " | 116.7% | 23.335 mm |
| 12 | " | " | 116.2% | 23.25 mm |
| 13 | " | " | 115.7% | 23.125 mm |
| 14 | " | " | 115.2% | 23.04 mm |
| 15 | " | " | 114.7% | 22.96 mm |
| 16 | " | " | 114.2% | 22.835 mm |
| 17 | " | " | 113.7% | 22.75 mm |
| 18 | " | " | 113.2% | 22.625 mm |

While these procedures could theoretically be executed mechanically through calculation, drawing and photography, a more practical way of doing so is through operation of digital computer equipment and its software capable of showing a digitized starting image on a screen and of being manipulated to distort and record the image after being altered through the procedures described above. Such equipment and its software are supplied, for example, by Scitex Corporation Ltd. of Bedford, Mass. (whose Imager III was used for the image 22*a* and -*b* example), and Picture Conversions, Inc. of Falls Church, Va.

Color images may be predistorted through the above procedures. This is preferably done through use of equipment and software having the capability of recording color images and applying the above procedures to them, and preferably also the capability of making and recombining color separations. The abovementioned suppliers provide equipment and software having all of these capabilities. The above procedures are preferably applied to color images before making color separations, but could be applied to individual color separations before recombining them to form a complete predistorted color image. An example of a separation of the undistorted image 22*a* is shown in FIG. 7 (copied from a magenta separation), and an example of a corresponding separation of the distorted image 22*b* is shown in FIG. 8 (copied from a yellow separation). The computer is also operable to combine any image with adjacent additional artwork, which may be prepared independently, with or without predistortion.

The disclosed procedure deals with circumferentially extending distortion. There is also a latent problem of distortion extending in the transverse direction (vertically as shown in FIGS. 2-5). The latter problem is preferably dealt with by using film with a low shrink capability in the machine direction (as high as 20% but preferably not over 15%) and positioning the film with its machine direction extending transversely to the circumference around which the film is wrapped. When this is done in the case of applying the image 22*b* to bottle 18 as shown in FIG. 4, further refinement of predistortion is not required to produce an acceptable result.

Figure 12:
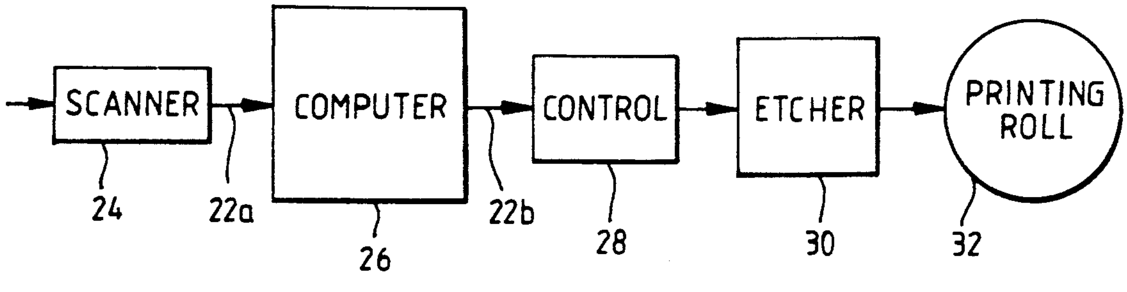
FIG. 12 shows a diagrammatic progression of processing of an image until it is etched on a printing roll.

Referring now to FIG. 12, the artwork of image 22*a* is preferably converted to digitized form by a scanner 24. A computer 26 receives the digitized image 22*a* and is operated to produce the predistorted image 22*b*. The image 22*b* is checked out for approval, including a review of it in combination with any related color separations and with any adjacent artwork. Conventional steps follow to cause computer 26 to operate a unit 28 controlling a roll etcher 30 so that it mechanically indents cavities in a printing roll 32 capable of printing a color separation of image 22*b* and any adjacent additional images on roll 32; roll 32 and any related color separation rolls are used to print image 22*b* and any adjacent artwork on film 10; film 10 is cut and placed around bottle 18 with image 22*b* in predetermined position on the bottle; and a series of such bottles and film wrap are passed through a shrink station, where the film is heated to shrink it on the bottle. The printing roll 32 may instead be chemically etched by conventional use of graphic output of image 22*b* from computer 26. Tests of shrinkage of a given printed shrink film on a given object in a given shrink line may be run to determine whether any adjustment of the predistortion of printing may be needed to accomplish the desired result in that particular line.

The following example illustrates manual practice of the invention. An image 42*a* (FIG. 11A) in the form of a parallelogram is to be applied to a film sleeve to be placed around and shrunk against a 10 ounce "Kraft" orange juice bottle of circular cross-section. The Kraft bottle is a little larger than the bottle 18 shown in FIGS. 2 and 5, and has a generally similar side view profile. The sleeve is longer than the bottle and after shrinking overlaps its top and bottom periphery.

The bottle circumference is determined at successive levels from bottom to top, and the percentage difference between each circumference and the sleeve circumference, which is 8.625 inches. The percentage difference is equal to the sleeve circumference less the bottle circumference divided by the sleeve circumference The design expansion factor for increasing the width of the image at successive levels is one plus said percentage difference. The figures so determined are as follows (dimensions in inches):

TABLE 2

| Height | Circumference | % Difference | Image Circumferential Expansion Factor |
|---|---|---|---|
| 0 | 6.2832 | 27.15 | 1.2715 |
| .150 | 7.1845 | 16.70 | 1.1670 |
| .250 | 7.3702 | 14.55 | 1.1455 |
| .350 | 7.5505 | 12.46 | 1.1246 |
| .450 | 7.7104 | 10.60 | 1.1060 |
| .550 | 7.8641 | 8.82 | 1.0882 |
| .650 | 8.0039 | 7.20 | 1.0720 |
| .750 | 8.1148 | 5.92 | 1.0592 |
| .850 | 8.2049 | 4.87 | 1.0487 |
| .950 | 8.2583 | 4.25 | 1.0425 |
| 1.050 | 8.2049 | 4.87 | 1.0487 |
| 1.150 | 8.2856 | 4.10 | 1.0410 |
| 1.250 | 8.2784 | 4.02 | 1.0420 |
| 1.350 | 8.2702 | 4.11 | 1.0411 |
| 1.450 | 8.2611 | 4.22 | 1.0422 |
| 1.550 | 8.2580 | 4.26 | 1.0426 |
| 1.650 | 8.2526 | 4.32 | 1.0432 |
| 1.750 | 8.2505 | 4.34 | 1.0434 |
| 1.850 | 8.2451 | 4.40 | 1.0440 |
| 1.950 | 8.2407 | 4.46 | 1.0446 |
| 2.050 | 8.2410 | 4.45 | 1.0445 |
| 2.150 | 8.2404 | 4.46 | 1.0446 |
| 2.250 | 8.2363 | 4.51 | 1.0451 |
| 2.350 | 8.2347 | 4.53 | 1.0453 |
| 2.450 | 8.2325 | 4.55 | 1.0455 |
| 2.550 | 8.2294 | 4.59 | 1.0459 |
| 2.650 | 8.2244 | 4.64 | 1.0464 |
| 2.750 | 8.1974 | 4.96 | 1.0496 |
| 2.850 | 8.1568 | 5.43 | 1.0543 |
| 2.950 | 8.0953 | 6.14 | 1.0614 |
| 3.050 | 8.0462 | 6.71 | 1.0670 |
| 3.150 | 7.9262 | 8.10 | 1.0810 |
| 3.250 | 7.8273 | 9.25 | 1.0925 |
| 3.350 | 7.7189 | 10.51 | 1.1051 |
| 3.450 | 7.5983 | 11.91 | 1.1191 |
| 3.550 | 7.4720 | 13.37 | 1.1337 |
| 3.650 | 7.3356 | 14.95 | 1.1495 |
| 3.750 | 7.1974 | 16.55 | 1.1655 |
| 3.850 | 7.0463 | 18.30 | 1.1830 |
| 3.950 | 6.8917 | 20.10 | 1.2010 |
| 4.050 | 6.7252 | 22.03 | 1.2203 |
| 4.150 | 6.5521 | 24.03 | 1.2403 |
| 4.250 | 6.3696 | 26.15 | 1.2615 |
| 4.350 | 6.1968 | 28.15 | 1.2815 |
| 4.450 | 6.0058 | 30.37 | 1.3037 |
| 4.550 | 5.7956 | 32.80 | 1.3280 |
| 4.650 | 5.5748 | 35.36 | 1.3536 |
| 4.750 | 5 3338 | 38.16 | 1.3816 |
| 4.850 | 5.0730 | 41.18 | 1.4118 |
| 4.950 | 4.8022 | 44.32 | 1.4432 |
| 5.050 | 4.5475 | 47.28 | 1.4728 |
| 5.150 | 4.3542 | 49.52 | 1.4952 |
| 5.250 | 4.2933 | 50.22 | 1.5022 |
| 5.350 | 4.2968 | 50.18 | 1.5013 |

The image parallelogram has equal sides and two opposite corners aligned vertically one above the other. The interior angle at each of said corners is 60°, and the distance between them is 2.6 inches. The image is to be positioned against the upper part of the bottle, as indicated by matching the height figures in the following left column with those shown in the preceding left column. The width of the image 42*a* at each level is recorded at each level of the image, and the expansion factor from the preceding right column is applied to said widths. The expanded widths are applied to the original image 42*a* to produce a predistorted image 42*b* (FIG. 11B) which will revert to substantially its original shape when shrunk on the bottle at the indicated position. The data appears in the following table (dimensions in inches):

TABLE 3

| Height From Bottle Base | Height From Bottom of Image | Width of Image | Image Width Expansion Factor | Predistorted Image Width |
|---|---|---|---|---|
| 2.750 | 0 | 0 | 1.050 | 0 |
| 2.850 | .100 | .116 | 1.050 | .122 |
| 2.950 | .200 | .231 | 1.061 | .245 |
| 3.050 | .300 | .346 | 1.067 | .370 |
| 3.150 | .400 | .462 | 1.081 | .499 |
| 3.250 | .500 | .577 | 1.093 | .631 |
| 3.350 | .600 | .693 | 1.105 | .766 |
| 3.450 | .700 | .808 | 1.119 | .704 |
| 3.550 | .800 | .924 | 1.133 | 1.047 |
| 3.650 | .900 | 1.039 | 1.150 | 1.195 |
| 3.750 | 1.000 | 1.155 | 1.166 | 1.346 |
| 3.850 | 1.100 | 1.270 | 1.183 | 1.503 |
| 3.950 | 1.200 | 1.386 | 1.201 | 1.693 |
| 4.050 | 1.300 | 1.501 | 1.220 | 1.831 |
| 4.150 | 1.400 | 1.386 | 1.240 | 1.668 |
| 4.250 | 1.500 | 1.270 | 1.262 | 1.603 |
| 4.350 | 1.600 | 1.155 | 1.282 | 1.480 |
| 4.450 | 1.700 | 1.039 | 1.304 | 1.355 |
| 4.550 | 1.800 | .924 | 1.328 | 1.227 |
| 4.650 | 1.900 | .808 | 1.354 | 1.094 |
| 4.750 | 2.000 | .693 | 1.392 | .957 |
| 4.850 | 2.100 | .577 | 1.412 | .815 |
| 4.950 | 2.200 | .462 | 1.443 | .667 |
| 5.050 | 2.300 | .346 | 1.473 | .510 |
| 5.150 | 2.400 | .231 | 1.495 | .345 |
| 5.250 | 2.500 | .116 | 1.502 | .173 |
| 5.350 | 2.600 | 0 | 1.502 | 0 |

Figure 11A:
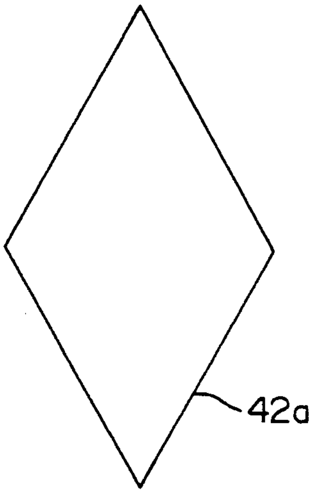
FIG. 11A shows an image in its initial form.
Figure 11B:
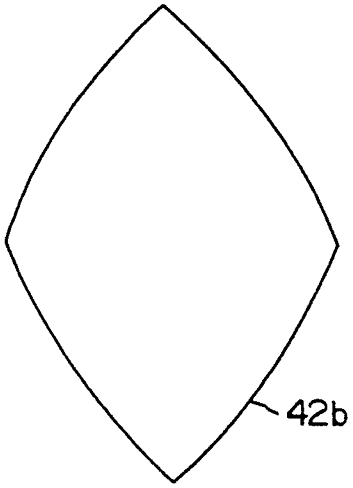
FIG. 11B shows the image of FIG. 11A after predistortion in accordance with the invention.
Figure 11C:
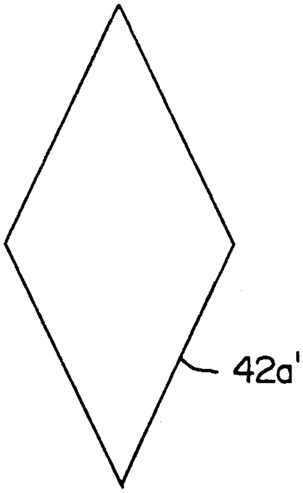
FIG. 11C shows the image of 11A after it has been printed on film in undistorted form and shrunk around a bottle.
Figure 11D:
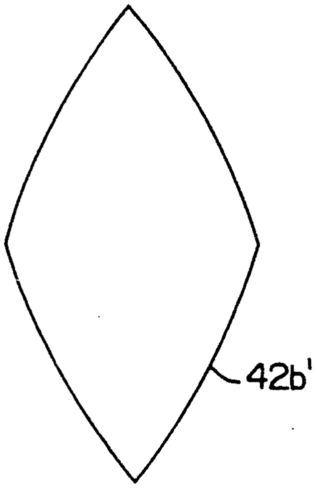
FIG. 11D shows the image of FIG. 11B after it has printed on film and similarly shrunk around a bottle.

Results of use of the Tables 2 and 3 data are illustrated in FIG. 11A, showing the original form of image 42*a*; in FIG. 11B, showing image 42*b* resulting from predistortion of image 42*a*; in FIG. 11C, showing a tracing on paper wrapped over the form of image 42*a*' resulting from applying image 42*a* without predistortion to shrink film and shrinking it against the indicated part of the bottle; and in FIG. 11D, showing a tracing on paper wrapped over the form of image 42*b*' resulting from applying predistorted image 42*b* to shrink film and shrinking it against the indicated part of the bottle. As can be seen, the final form of image is closer to the original (FIG. 11A) when predistortion has been used (FIG. 11D) than when it has not been used (FIG. 11C).

Figure 13B:
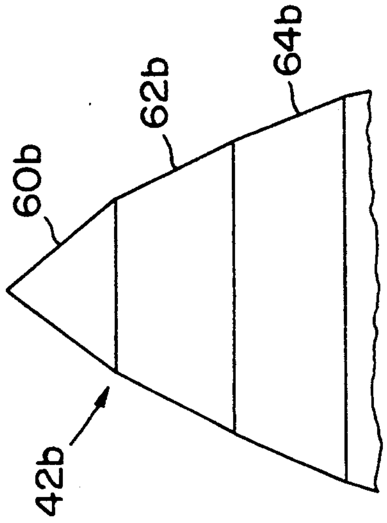
FIG. 13B is an exploded schematic expanded view of the uppermost portion of FIG. 11B showing the first three subdivisions thereof after predistortion.
Figure 13A:
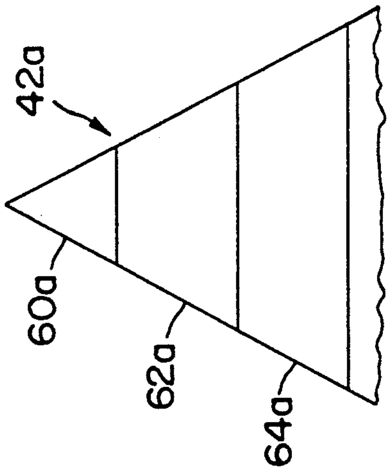
FIG. 13A is an schematic expanded view of the uppermost portion of the image 42*a* of FIG. 11A showing the first three subdivisions thereof prior to predistortion.

FIG. 13A schematically represents the three bottommost subdivisions 60*a*, 62*a*, and 64*a* of Table 2 prior to predistortion.

FIG. 13B schematically represents the three bottommost subdivisions 60*b*, 62*b*, and 64*b* of Table 3 lafter predistortion.

For purposes of the invention, artwork or image includes text as well as art. The shrink film used may be transparent and printed on either side, or opaque and printed on the outside. The material of the film is preferably polymeric. Polyvinyl chloride is a common example.

While present preferred embodiments and methods of practicing the invention have been illustrated and described, it will be understood that the invention may be otherwise variously embodied and practiced within the scope of the following claims.

I claim:

1. A method of providing a predistorted image to be printed on shrinkable sheet for packaging an object, so that the predistorted image will return to substantially its undistorted form when the part of the sheet bearing the image is placed circumferentially around the object and shrunk against a predetermined part of the object; comprising the steps of:

(a) recording an image in its undistorted form;

(b) subdividing said recorded image at successive levels extending in the direction which will be circumferential of the object, thereby providing an assembly of elongated subdivisions;

(c) determining the circumferential shrinkage of the sheet likely to occur in the direction of elongation of each subdivision upon shrinkage of the part of the sheet bearing the image against a predetermined part of the object;

(d) elongating each subdivision to offset said shrinkage of that subdivision; and (e) recording the resultant predistorted image.

2. The method of claim 1, in which said steps of recording, subdividing, elongating and recording are performed by electronic means.

3. The method of claim 1, further including the step of etching the resultant predistorted image on a printing roll;

4. The method of claim 1, further including the step of printing the predistorted image on sheet having its maximum shrink capability in said direction across the image.

5. The method of claim 1, in which said sheet is polymeric film.

6. The method of claim 3, in which said sheet is heat shrinkable polymeric film.

* * * * *